Patented July 16, 1946

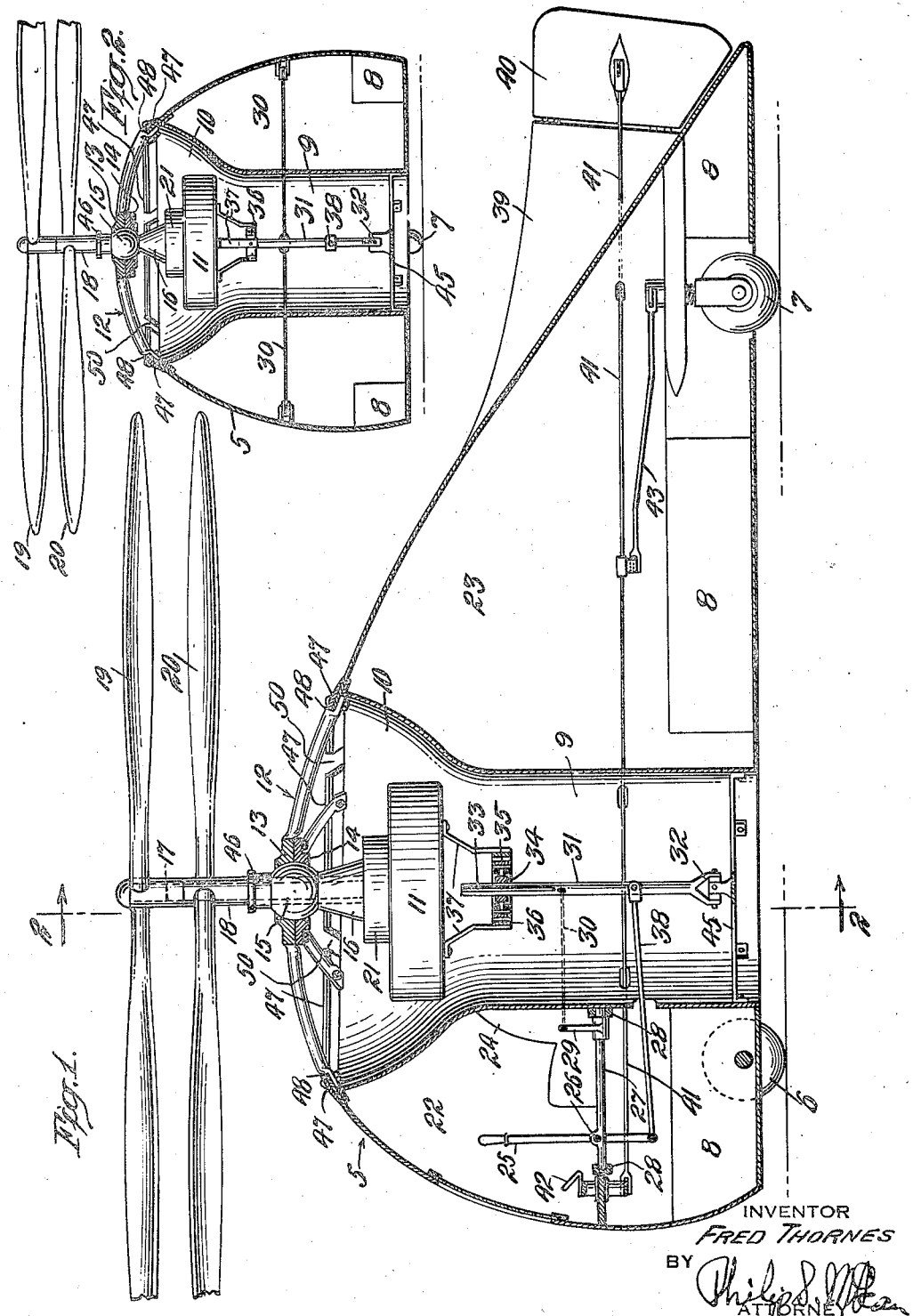

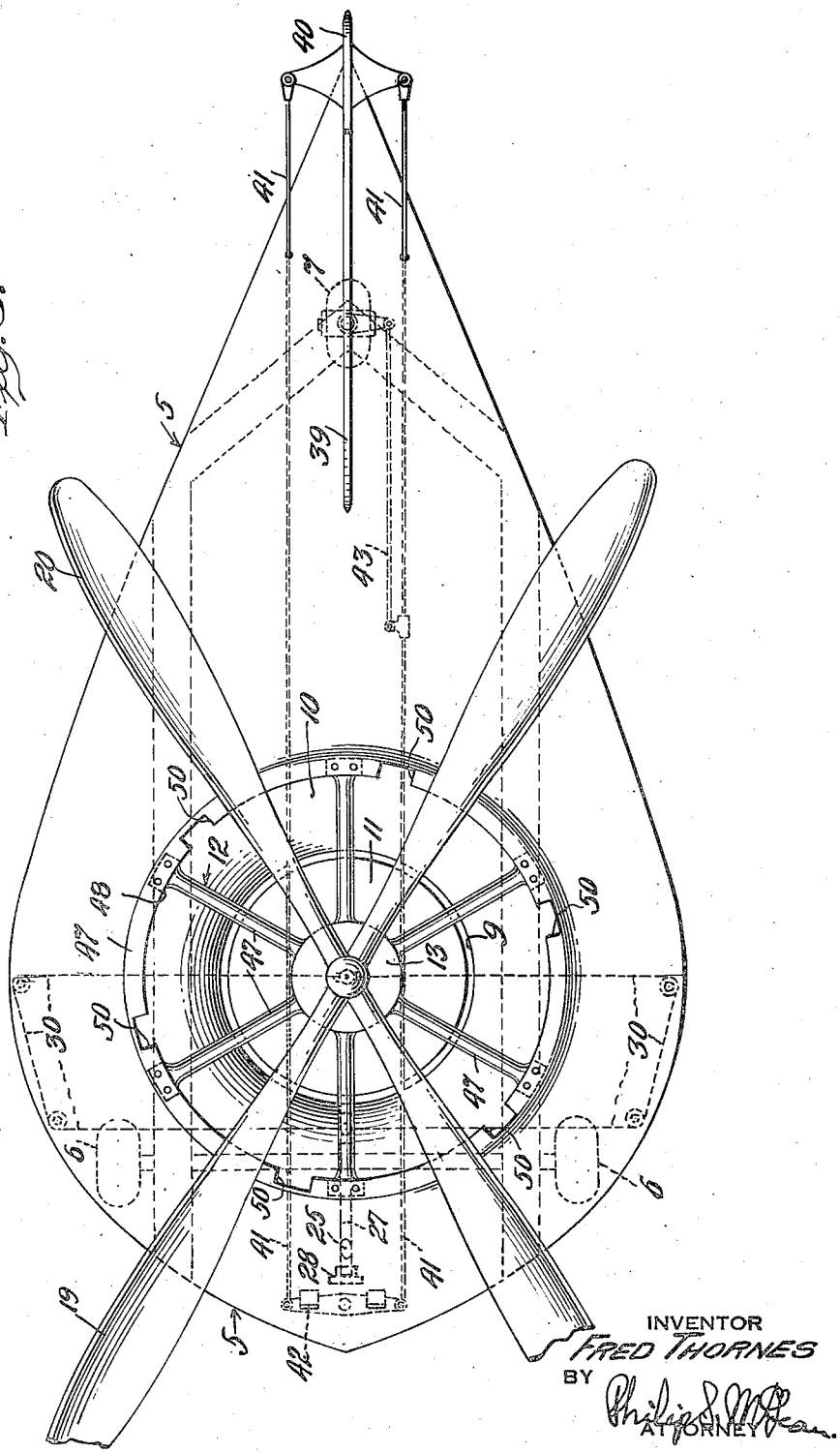

2,404,014

UNITED STATES PATENT OFFICE 2,404,014

HELICOPTER

Fred Thornes, Toms River, N. J.

Application February 1, 1943, Serial No. 474,401

1 Claim. (Cl. 244—17)

The invention here disclosed relates to aircraft of the direct lift type and the objects of the invention are to provide such a machine, having high lift and low air resistance characteristics, which can be easily controlled and in a manner resembling the control of an ordinary airplane and which in addition to the special capabilities of vertical rising, hovering, forward, backward and sidewise flight, will have the further capability of manoeuverability on land and water.

Further objects and purposes of the invention will appear in the course of the following specification.

The drawings accompanying and forming part of the specification illustrate a present practical embodiment of the invention, but structure and operation may be modified and changed, all within the true intent and broad scope of the invention, as hereinafter defined and claimed.

Fig. 1 in the drawings is a vertical longitudinal sectional view of one of the helicopters.

Fig. 2 is a broken cross-sectional view as on substantially the plane of line 2—2 of Fig. 1.

Fig. 3 is a plan view of the machine.

One of the special features of the invention is the construction of the fuselage 5, for navigation in air, or on land or water.

To these ends, the fuselage is contoured in substantially teardrop design, as illustrated, streamlined to vertical and to horizontal or inclined flight.

Spaced front wheels 6, and a steerable rear wheel 7, are shown by which the machine may ride and be directed on land.

The lower portion of the fuselage is shown constructed on the order of a boat hull and containing flotation tanks 8, enabling navigation on water.

A vertical passage 9, is provided extending down through the forward main body portion of the fuselage and having a somewhat conical formation at the upper end at 10, large enough to fully and freely receive the engine 11.

The upper end of the vertical air passage is arched over by a radial frame or spider 12, having at the center the companion upper and lower elements 13, 14, of a ball cage or socket, providing a universal bearing and support for the ball 15, from which the engine is suspended by the truncated conical tubular support 16.

The engine is shown as having concentric reversely rotating shafts 17, 18, projecting up through the ball of the universal mounting and carrying the reversely rotating propellers 19, 20. Suitable reduction and reverse driving gears may be arranged in the upper portion of the engine case at 21, and the ball mount 15, may carry suitable bearings and lubricating means for the oppositely rotating shafts.

The pilot's compartment is indicated at 22, forward of the vertical wind tunnel and a cargo or storage compartment 23, aft the wind tunnel.

In the pilot's compartment, a suitable seat or seating accommodations are provided at 24, and controls, preferably more or less corresponding to conventional aircraft controls.

In the illustration, the controls comprise a stick 25, pivoted at 26, for fore and aft rocking movement on a tube 27, journalled in bearings 28, and carrying an upstanding lever 29, connected by cables 30, with opposite sides of a control post 31.

The post 31, is shown supported non-rotatably at its lower end by a universal mounting 32, below and in line with the upper universal mounting at 15, and as slidingly keyed at its upper end at 33, in the inner ring 34, of a pair of gimbal rings, the outer element 35, of which is journalled in a cage 36, attached by struts 37, to the lower side of the engine.

This non-rotating but universally rocking control post is shown connected by a drag link 38, with the lower end of the control stick 25.

This control post thus provides a means for preventing axial rotation of the engine which may not be fully overcome by the reversely rotating propellers and a means for swinging the engine and propeller unit into different angular relations.

In the arrangement illustrated, the fore and aft movements of the stick effect forward and rearward tilting movements of the propellers and movement of the stick to one side rocks the propellers toward that side, thus enabling the stick to exercise a control similar to that in an ordinary airplane, so that pilots accustomed to standard controls can naturally and more or less instinctively manoeuvre the present machine.

While steering may largely be effected by "pointing" of the propellers in the direction of flight, some rudder control may be necessary or desirable. Accordingly, the fuselage is shown as carrying a vertical stabilizer 39, and rudder 40, the latter connected by cables or rods 41, with a rudder bar or equivalent 42.

For steering on land and to some extent, on water, the tail wheel 7, is shown connected by linkage 43, with the rudder operating connections 41.

The universal mounting 32, for the upright adjusting tube 31, may be carried by a bar or stream-lined spider 45, secured across the lower end of the vertical wind tunnel. The length of this tube and the operating connections thereto may be proportioned to apply the leverage necessary for easy shifting movements of the engine unit. Such shifting movements also are facilitated by arranging the propellers and engine at positions above and below the ball joint sufficient for each substantially to counterbalance the other.

A single large size ball joint, such as illustrated, is at present considered preferable to a universal joint of the angularly related pivot construction because of the greater distributed bearing area. This ball construction also provides for as large a shaft bearing 46, as may be considered desirable and any necessary controls or supply connections for the engine can, if desired, be extended through the ball at the sides of such shaft bearing.

The spider of frame 12, for the ball bearing is shown as having readily attachable connections with the fuselage at 48, such as to permit the entire propeller, bearing and engine assembly to be lifted up clear of the wind tunnel. The ring or flange 47, to which the arms of the spider are shown connected, may be notched or cut away as indicated at 50, to provide clearance for the ends of the spider arms in such removal of the assembly.

The removable lower half 14, of the ball bearing permits the engine unit to be dropped down through the wind tunnel for inspection, repair or replacement purposes.

The vertical wind tunnel confines a cushion of air which is of assistance in gettting off the land or water and in flight provides a sustaining and stabilizing column of air.

This wind tunnel also provides a practical housing and air cooling duct for the engine.

The propellers may be of the two bladed type so that they may be lined up more or less longitudinally for storing the craft in smaller space. Also, these propellers may be long enough and have sufficient area to operate on the autogiro principle to sustain the craft to a desirable extent with the motor shut off. If desired, certain of the wheels may be power driven, either from the engine or from a separate power source for propelling the machine on land. The controls may be balanced or compensated so as to naturally return to a neutral position. If found desirable however, to hold the stick for instance, in a position to which it may be adjusted, some special holding means as of the pawl and ratchet type may be provided for the purpose.

What is claimed is:

Aircraft of the character disclosed comprising a fuselage having a vertical air passage down through the body of the same, a universal mounting on said fuselage at the upper end of said air passage, an engine suspended by said universal mounting in said vertical air passage and free for universal swinging adjustments but held against rotary movement in said passage, rotary sustaining means carried and driven by said universally mounted engine above said air passage and arranged to force a blast of air at various angles or straight down through said air passage, depending upon different angular adjustments of said engine in said passage, control means in said fuselage exteriorly of said vertical air passage, and operating connections extending from said control means into said air passage for swinging said engine angularly in said air passage in accordance with operation of said control means, said operating connections including universal joint connections and being readily separable and said universal mounting for the engine and sustaining means being readily separable from the fuselage to enable the engine being readily lifted up out of the air passage, a fixed support across the lower end of said air passage, said universal joint connections including a generally vertical post having a universal, non-rotating mounting at its lower end on said support and a non-rotative, sliding universal connection between the upper end of said post and said engine, and said operating connections including mechanical connections engaged with said post between its upper and lower ends for swinging the same in different directions and for thereby swinging said engine into different angular positions in said vertical air passage.

FRED THORNES.